(12) United States Patent
Riehle et al.

(10) Patent No.: US 7,766,415 B2
(45) Date of Patent: Aug. 3, 2010

(54) WINDBREAK DEVICE

(75) Inventors: Joerg Riehle, Asperg (DE); Peter Neumann, Oberstenfeld (DE)

(73) Assignee: Scambia Industrial Developments Aktiengesellschaft, Schaan (LI)

( * ) Notice: Subject to any disclaimer, the term of this patent is extended or adjusted under 35 U.S.C. 154(b) by 169 days.

(21) Appl. No.: 11/900,408

(22) Filed: Sep. 10, 2007

(65) Prior Publication Data

US 2008/0088153 A1    Apr. 17, 2008

(30) Foreign Application Priority Data

Sep. 12, 2006    (DE) .................. 10 2006 043 626

(51) Int. Cl.
| | |
|---|---|
| H01L 31/048 | (2006.01) |
| B60J 7/22 | (2006.01) |
| B60J 1/20 | (2006.01) |
| B62D 35/00 | (2006.01) |

(52) U.S. Cl. ............... 296/180.1; 136/206; D13/102
(58) Field of Classification Search ............ 49/333, 49/334, 335; 52/173.3; 136/206, 251, 291; 296/85, 180.1, 180.5; D13/102
See application file for complete search history.

(56) References Cited

U.S. PATENT DOCUMENTS

| | | | | |
|---|---|---|---|---|
| 4,660,879 | A | * | 4/1987 | Kobayashi et al. ........ 296/180.5 |
| 5,195,799 | A | * | 3/1993 | Gotz et al. .............. 296/180.1 |
| 5,211,718 | A | * | 5/1993 | Gotz et al. .............. 296/180.1 |
| 5,219,201 | A | * | 6/1993 | Gotz et al. .............. 296/180.1 |
| 5,253,916 | A | * | 10/1993 | Moore et al. ............ 296/180.5 |
| 5,318,337 | A | * | 6/1994 | Gotz et al. .............. 296/180.5 |
| 5,344,361 | A | * | 9/1994 | Matthias ................... 454/129 |
| 5,438,799 | A | * | 8/1995 | Le Faucheur ................ 49/49 |
| 5,738,404 | A | * | 4/1998 | Stadler et al. ............ 296/180.1 |
| 5,765,905 | A | * | 6/1998 | Hemmis et al. .......... 296/180.1 |
| 5,803,530 | A | * | 9/1998 | Skrzypek et al. ......... 296/180.1 |
| 5,814,906 | A | * | 9/1998 | Spencer et al. ............. 307/150 |
| 5,905,356 | A | * | 5/1999 | Wells ........................ 320/101 |
| 6,557,928 | B2 | * | 5/2003 | Dreher et al. ............ 296/180.1 |
| D479,191 | S | * | 9/2003 | Peress et al. ............... D13/102 |
| D489,680 | S | * | 5/2004 | Stobart ..................... D13/107 |
| D530,036 | S | * | 10/2006 | Strycker .................... D26/67 |
| 7,367,608 | B2 | * | 5/2008 | Rimmelspacher et al. ........................ 296/180.1 |
| 7,486,044 | B2 | * | 2/2009 | Patino et al. ................ 320/103 |

(Continued)

FOREIGN PATENT DOCUMENTS

DE    3611750 A1 * 10/1987

(Continued)

*Primary Examiner*—Glenn Dayoan
*Assistant Examiner*—Paul A Chenevert
(74) *Attorney, Agent, or Firm*—Lipsitz & McAllister, LLC (57) ABSTRACT

A windbreak device for motor vehicles, in particular cabriolet vehicles, is provided, comprising a windbreak base which is disposed level with a beltline of a vehicle body, and a wind deflector which is connected to the windbreak base in an articulated manner and can be pivoted from an inactive position, which extends approximately level with the beltline of the vehicle body, into an active position which rises above the beltline and runs transverse with respect to said beltline, and an electric drive unit by which the wind deflector can be moved between the inactive and the active position relative to the windbreak base. The windbreak device is provided with a rechargeable battery which provides electrical energy for operating the electric drive unit.

35 Claims, 10 Drawing Sheets

U.S. PATENT DOCUMENTS

| | | | |
|---|---|---|---|
| 2002/0089214 A1* | 7/2002 | Gloss | 296/180.1 |
| 2002/0096911 A1* | 7/2002 | Maeurle et al. | 296/180.1 |
| 2006/0022488 A1* | 2/2006 | Kreis et al. | 296/180.1 |
| 2006/0208532 A1* | 9/2006 | Albrecht | 296/180.1 |
| 2007/0040413 A1 | 2/2007 | Rimmelspacher et al. | |
| 2008/0072949 A1* | 3/2008 | Rowell et al. | 136/244 |

FOREIGN PATENT DOCUMENTS

| | | | |
|---|---|---|---|
| DE | 4018862 A1 * | 1/1992 | |
| DE | 4119530 A1 * | 12/1992 | |
| DE | 4315139 A1 * | 11/1993 | |
| DE | 4315201 A1 * | 2/1994 | |
| DE | 4235416 A1 * | 4/1994 | |
| DE | 4311240 C1 * | 4/1994 | |
| DE | 4338102 | 5/1995 | |
| DE | 296 15 342 | 10/1996 | |
| DE | 199 37 877 | 11/2000 | |
| EP | 1621386 | 2/2006 | |
| GB | 2182010 A * | 5/1987 | |
| JP | 60022564 A * | 2/1985 | |
| JP | 60022565 A * | 2/1985 | |
| JP | 60022566 A * | 2/1985 | |
| JP | 60236854 A * | 11/1985 | |
| JP | 01187880 A * | 7/1989 | |
| JP | 06156327 A * | 6/1994 | |

* cited by examiner

WINDBREAK DEVICE

This patent application claims the benefit of German Application No. 10 2006 043 626.1, filed Sep. 12, 2006.

BACKGROUND OF THE INVENTION

The invention relates to a windbreak device for motor vehicles, in particular cabriolet vehicles, comprising a windbreak base which is disposed level with a beltline of a vehicle body, and a wind deflector which is connected to the windbreak base in an articulated manner and can be pivoted from an inactive position, which extends approximately level with the beltline of the vehicle body, into an active position which rises above the beltline and runs transverse with respect to said beltline, and an electric drive unit by which the wind deflector can be moved between the inactive and the active position relative to the windbreak base.

Windbreak devices of this type are known from the prior art, for example DE 296 15 342 U1.

The problem with these windbreak devices is that the electrical power supply of the wind deflector requires complex measures.

It is therefore an object of the invention to improve a windbreak device of this generic type in such a way that it can be handled as easily as possible, in particular can be assembled on and disassembled from the motor vehicle as easily as possible.

SUMMARY OF THE INVENTION

According to the invention, this object is achieved for a windbreak device of the type described in the introduction by the windbreak device being provided with an electrical energy storage means which provides electrical energy for operating the electric drive unit.

The advantage of the solution according to the invention can be seen in that this windbreak device is completely autonomous and there is therefore absolutely no need to make or break a connection to an energy source, for example to the on-board motor-vehicle electrical system, during assembly of the windbreak device or disassembly of the windbreak device.

Instead, a windbreak device of this type can be assembled in the same way as a conventional manually operated windbreak device, but offers the advantage that in this windbreak device the wind deflector can be electrically moved to and fro between the inactive position and the active position relative to the windbreak base.

The energy storage means is, for example, a rechargeable battery or a battery separate from the on-board motor-vehicle electrical system.

In order to avoid recharging of the at least one energy storage means and for this energy storage means to always be as fully charged as possible, provision is advantageously made for the windbreak device to be provided with solar cells by which the at least one electrical energy storage means can be charged.

In order to enable the electrical energy storage means to be optimally charged by the solar cells, it is expedient for the solar cells to be disposed on a side of the windbreak device which faces away from the vehicle body.

An advantageous solution provides for the solar cells to be disposed in the region of the wind deflector.

In this case, the solar cells could be disposed in any region of the wind deflector, for example including disposition in an inner region of the wind deflector.

However, an expedient solution provides for the wind deflector to have a frame, and for the solar cells to be mounted on the frame of the wind deflector.

In this case, the solar cells could be mounted on the frame such that they extend beyond a frame opening.

A solution which is advantageous visually and in practical terms provides for the solar cells to be disposed on the frame.

In an advantageous exemplary embodiment, provision is made in this case for the solar cells to be disposed in a frame region.

In this case, the solar cells could be mounted on the frame, that is to say on a surface of the frame. A solution which is expedient with regard to the protection of the solar cells in this case provides for the solar cells to be integrated into an upper face of the frame.

As an alternative or in addition, a further exemplary embodiment provides for the solar cells to be disposed in the region of the windbreak base.

In this case, the solar cells can, in principle, be disposed on either side of the windbreak base.

In order to obtain an optimum incidence of light, provision is preferably made for the solar cells to be disposed on a side of the windbreak base which faces away from the vehicle body.

In principle, the solar cells can be disposed on the windbreak base in any desired manner. An advantageous exemplary embodiment provides for the windbreak base to have a frame, and for the solar cells to be mounted on the frame.

In this solution, the solar cells could project beyond the frame, for example extend beyond a frame opening provided that they are held by the frame.

A solution which is expedient from an aesthetic point of view provides for the solar cells to be disposed on or upon the frame, that is to say these solar cells sit directly on or upon the frame.

In this case, disposing the solar cells on the frame could mean that the solar cells are distributed over the entire frame. An expedient solution provides for the solar cells to be disposed on a frame member. In this solution, a particularly aesthetically pleasing variant can be found by selecting a suitable frame member.

A further advantageous solution provides for the frame to have frame openings, and for the solar cells to be disposed in the region of the frame openings. In this solution, it is possible to utilize the frame opening which is present in any case, for the purpose of disposing solar cells with a sufficiently large surface in an expedient manner without modifying the windbreak devices known to date.

In this case, the solar cells themselves could form a frame insert.

In this case, provision is preferably made for the solar cells to be covered by a flat material which covers over the frame openings. This solution has the advantage that the solar cells can be attached to the windbreak device in a visually substantially inconspicuous manner since, when looking at the windbreak base from above, the visual impression is affected by the flat material and, on account of the fact that the flat material covers over the solar cells, the surface of the solar cells is inconspicuous.

In order for there to always be a sufficient incidence of light on the solar cells, provision is preferably made for the flat material to be at least partially transparent.

It is even possible to form the flat material such that it is more transparent in the region in which it covers over the solar cells compared to other flat material regions.

Variation in the transparency of the flat material in the region of the solar cells permits, in particular, the flat material to have a lower thread density in its region which covers over the solar cells than in other regions. That is to say, more free space for the light passing through remains between the threads of the flat material as a result.

In terms of the arrangement of the solar cells themselves, no further information has been provided in conjunction with the above explanation of the individual exemplary embodiments. Therefore, an advantageous exemplary embodiment provides for the solar cells to be disposed on a support housing.

In this case, the solar cells can be disposed on the support housing in a simple manner. However, it is even better if the solar cells are integrated into an upper face of the support housing, that is to say they are disposed in the upper face of the support housing such that they are protected, for example by virtue of being disposed in the upper face of the support housing such that they are recessed with respect to structures which surround them.

An extremely wide variety of options are available for positioning the support housing on the frame.

In the simplest case, provision is made to fix the support housing to the frame so that the support housing automatically remains on the frame when the windbreak device is stowed away.

However, in order to create the option for providing different windbreak devices with a support housing, provision is preferably made for the support housing to be detachably fixed to the frame.

Such detachable fixing of the support housing to the frame is to be understood as any type of retrofit and detachable, that is to say exchangeable, fixing of support housings.

In a case such as this, the support housing is then a separate element which can be secured to the frame.

However, a support housing of this type does not necessarily have to be used only to support the solar cells, but the support housing can additionally be used in a variety of ways.

An advantageous solution therefore provides for the at least one electrical energy storage means to be disposed in the support housing.

A further advantageous solution provides for a control unit to be disposed in the support housing, said control unit monitoring and controlling at least the charge state of the electrical energy storage means by the solar cells.

Particularly in the case of a collapsible windbreak device, provision is preferably made for the windbreak base to have two windbreak base parts, and for the support housing for the solar cells to be mounted at least on one of the windbreak base parts.

As an alternative or in addition to providing a separate support housing for the location of the solar cells, a further exemplary embodiment provides for a frame of the windbreak base to form a support region for the solar cells.

In this case, a large number of degrees of freedom are provided within the scope of the solution according to the invention, the degrees of freedom permitting the frame to be formed such that its support region is suitable for accommodating the solar cells.

In this case, it is feasible, for example, to form the support region of the frame as a region of a frame support which has a flattened but widened cross section.

Provision is also preferably made for the frame to form a housing for the electrical energy storage means.

In this case, the support region, for example, could be formed such that it forms a housing for the electrical energy storage means. However, it is also possible to form other regions of the frame such that the frame is able to accommodate the electrical energy storage means.

To date, no further information has been provided with regard to the way in which the windbreak device according to the invention is controlled.

For efficient operation, it is expedient if the windbreak device comprises a control unit which monitors at least a charge state of the at least one energy storage means.

Furthermore, it is expedient, as an alternative or in addition, if the frame forms a housing for the control unit. Even to accommodate the control unit, it is not absolutely necessary to configure the support region such that it is able to accommodate the control unit. Instead, any desired point on the frame would be suitable for accommodating the control unit.

In this case, the frame is preferably formed either with a region with a sufficiently large cross section or a flattened region for accommodating the control unit.

Many variants are feasible in terms of forming the control unit. A minimal version of the control unit therefore provides for the control unit to be able to pivot the wind deflector between its active and its inactive position and to stop the respective drive unit in these positions, for example by detecting rotational positions of the drive unit.

However, it is even more advantageous if the control unit comprises a function control means for the wind deflector.

A function control means of this type provides, for example, that complete function sequences can be realized by means of suitable manual entries for movement of the wind deflector.

For example, it would be feasible to form the function control means such that it tilts the wind deflector into the suitable predefined position when operated once.

In order to be able to activate the function control means in a simple manner, provision is preferably made for the function control means to communicate with a manual operator control unit.

Another advantageous solution provides for the function control means to communicate with a manual operator control unit which is fixedly disposed on the windbreak device.

The control unit can be disposed on the windbreak device in an extremely wide variety of ways.

It would therefore be feasible to provide the control unit in a separate housing which is disposed on the windbreak device, for example together with the manual operator control unit.

In order to provide a visually pleasant design, the control unit is disposed in the support housing.

As an alternative or in addition to this, the control unit is disposed in a frame of the windbreak device.

The manual operator control unit can be disposed at any desired point on the windbreak device, in particular on the wind deflector itself or on the windbreak base.

A particularly favorable solution provides for the manual operator control unit to be disposed on the windbreak base.

In this case, the manual operator control unit is preferably disposed on a side which faces a driver of the vehicle.

Such an arrangement of the manual operator control unit provides, for example, for this manual operator control unit to be disposed on a front crossmember of the windbreak base, preferably on a side which faces the driver.

However, as an alternative or in addition to this, it would also be feasible to locate the manual operator control unit in the support housing for the solar cells, in order to obtain a solution which is as compact as possible and in particular does not require the frame either of the wind deflector or of the windbreak base to be modified.

In this case, it is particularly preferable if the manual operator control unit is disposed in the housing for the at least one energy storage means.

In this case, the function control means can communicate with the manual operator control unit in any desired way.

An advantageous solution provides for the function control means to communicate with the manual operator control unit, in particular a portable manual operator control unit, in a wire-free fashion.

As an alternative to contact-free interaction between the function control means and the portable manual operator control means, a further solution provides for the function control means to communicate with a vehicle function control means, the vehicle function control means being in the form of a function control unit for a vehicle locking system, for example.

In this case, it is particularly advantageous if the function control means communicates with the vehicle function control means in a contact-free fashion.

To date, no further information has been provided with regard to the individual functions, in particular correlation of the position of the wind deflector with individual functions of the motor vehicle.

An advantageous solution therefore provides for the vehicle function control means to initiate movement of the wind deflector from the inactive position to the active position via the function control means of the windbreak device if the motor vehicle exceeds a predefinable speed.

As an alternative or in addition to this, a further advantageous embodiment provides for the vehicle function control means to initiate movement of the wind deflector from the inactive position to the active position via the function control means when the top of the motor vehicle is opened.

As an alternative or in addition, a further embodiment provides for the vehicle function control means to initiate movement of the wind deflector from the active position to the inactive position via the function control means when a reverse gear is engaged.

As an alternative or in addition to the previous functions, one embodiment also provides for the vehicle function control means to initiate movement of the wind deflector from the inactive position to the active position via the function control means when all windows of the motor vehicle are raised.

As an alternative or in addition to the previous solutions, one embodiment finally provides for the vehicle function control means to initiate movement of the wind deflector between an inactive position and an active position or vice versa via the function control means when a corresponding operator control key on the vehicle is operated.

The abovementioned function modes of the function control means can be firmly predefined.

However, a solution in which the individual function modes—individually or in groups or in their entirety—can be activated and deactivated is particularly favorable.

A further advantageous solution provides for the manual operator control unit to be disposed in the housing for the control unit.

No further information has been provided with regard to the arrangement of the electric drive unit in conjunction with the above explanation of the individual exemplary embodiments.

It would therefore be feasible, for example, to provide the drive unit on or in the wind deflector.

However, a solution which is particularly favorable in terms of design provides for the electric drive unit to be disposed on the windbreak base.

In this case, the electric drive unit is preferably integrated into the windbreak base, in order to obtain a visually pleasant solution.

A solution which is particularly advantageous in terms of design provides for the windbreak base to have a support member, and for the electric drive unit to be integrated into a region of a support member of the windbreak base.

Provision is particularly made for the windbreak base to have at least two windbreak base parts, and for the electric drive unit to be integrated into one of the windbreak base parts.

Further features and advantages of the invention form the subject matter of the following description and of the illustration in the drawing of a number of exemplary embodiments.

DETAILED DESCRIPTION OF THE INVENTION

Figure 1:
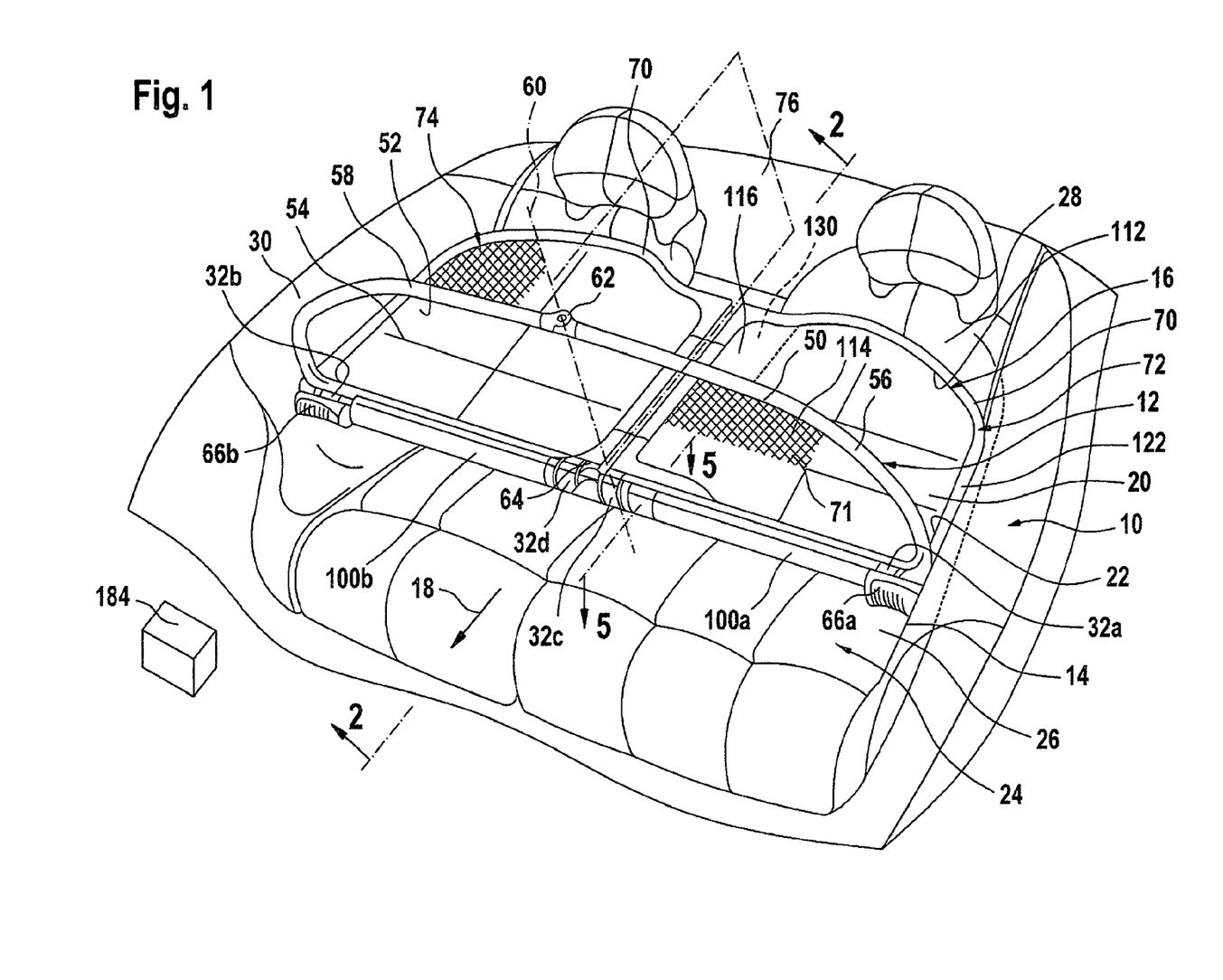
FIG. 1 shows a perspective view of a first exemplary embodiment of a windbreak device according to the invention in an active position of the wind deflector, the windbreak device being mounted in a vehicle body which is partially illustrated.

An exemplary embodiment, which is illustrated in FIG. 1, of a windbreak device according to the invention for motor vehicles, in particular for cabriolet vehicles, whose vehicle body 10 is illustrated in part in FIG. 1, comprises a wind deflector 12 which is illustrated in its active position in FIG. 1 and in this position projects upwards beyond a beltline 14 of the body 10 of the motor vehicle, and also comprises a windbreak base 16 which covers a subregion 20 of a passenger space opening 22 which is disposed approximately level with the beltline 14, said subregion being situated behind the wind deflector 12, which is in its active position, with respect to a direction of travel 18.

For example, the subregion 20 of the passenger space opening 22 is situated above a rear seat system 24 which has a bench 26 and a rear seat backrest 28.

The subregion 20 of the passenger space opening 22 preferably directly adjoins the rear seat backrest 28 and extends in the direction of travel 18 as far as the wind deflector 12, likewise such that it is connected to vehicle body side walls 30 in the region of the beltline 14.

The wind deflector 12 is expediently seated in its active position such that this wind deflector is disposed substantially directly behind headrests (which are not illustrated in the drawing in FIG. 1) of front seats of the motor vehicle.

Figure 2:
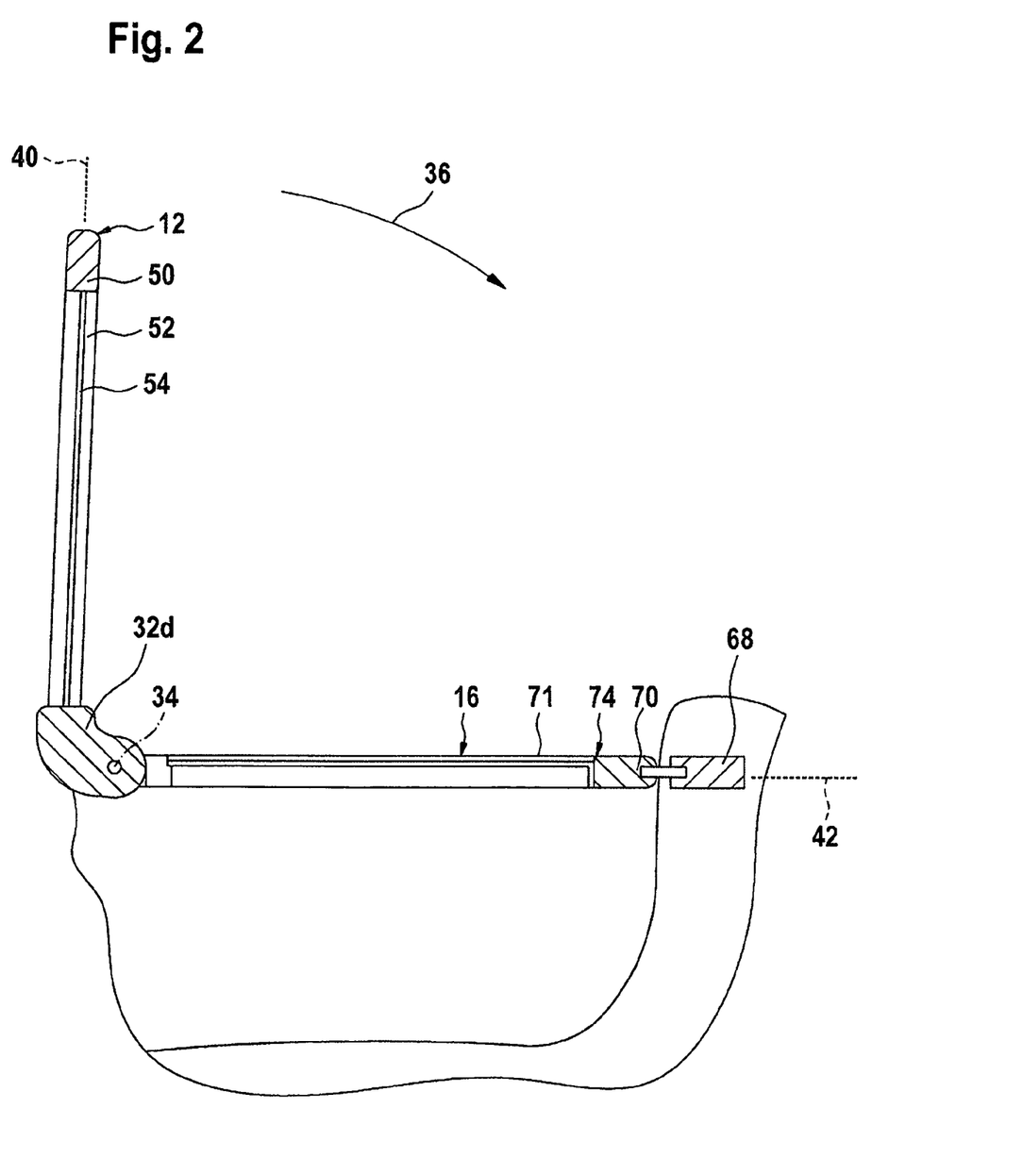
FIG. 2 shows a section along line 2-2 in FIG. 1.
Figure 3:
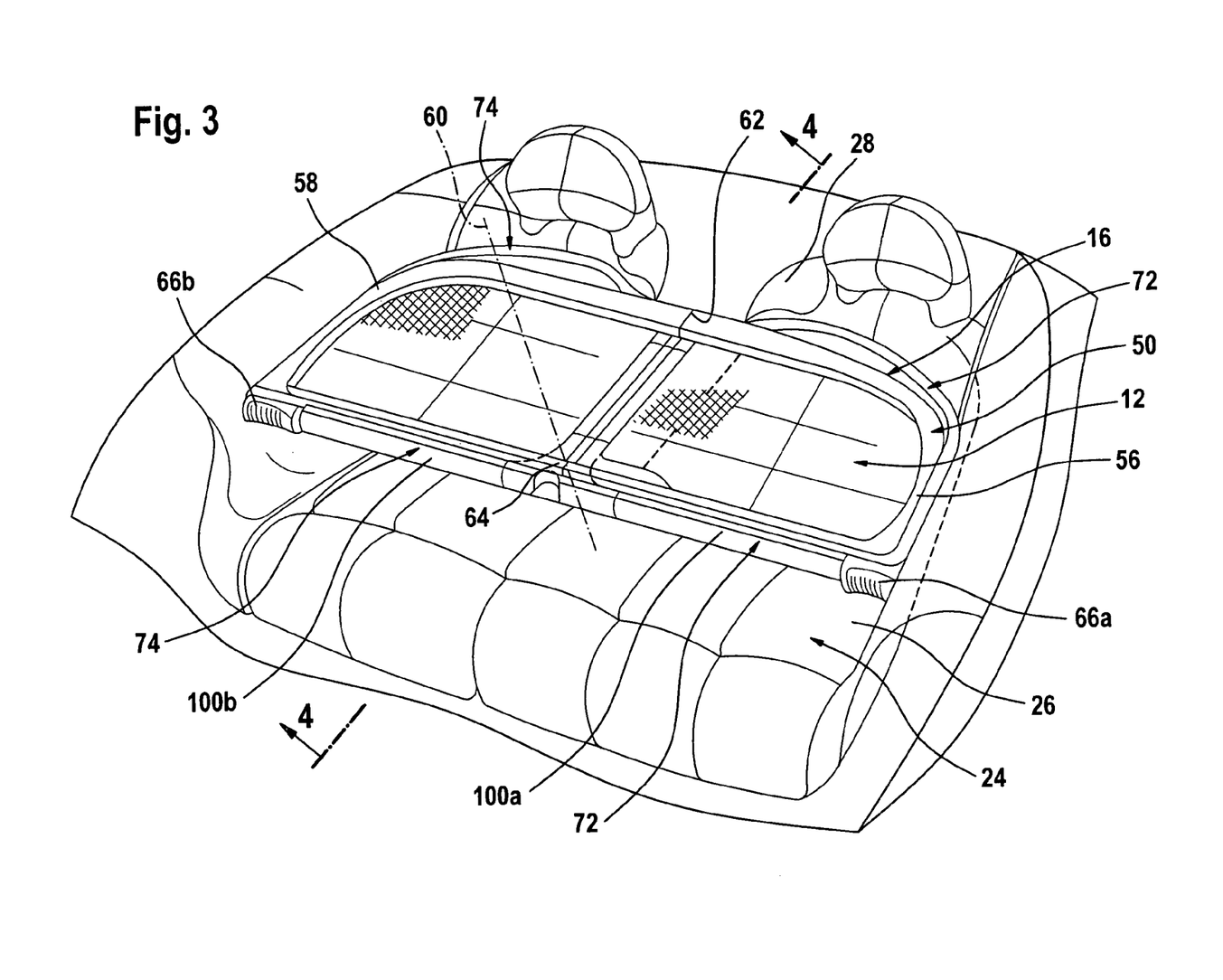
FIG. 3 shows a perspective illustration similar to FIG. 1 in an inactive position of the wind deflector.
Figure 4:
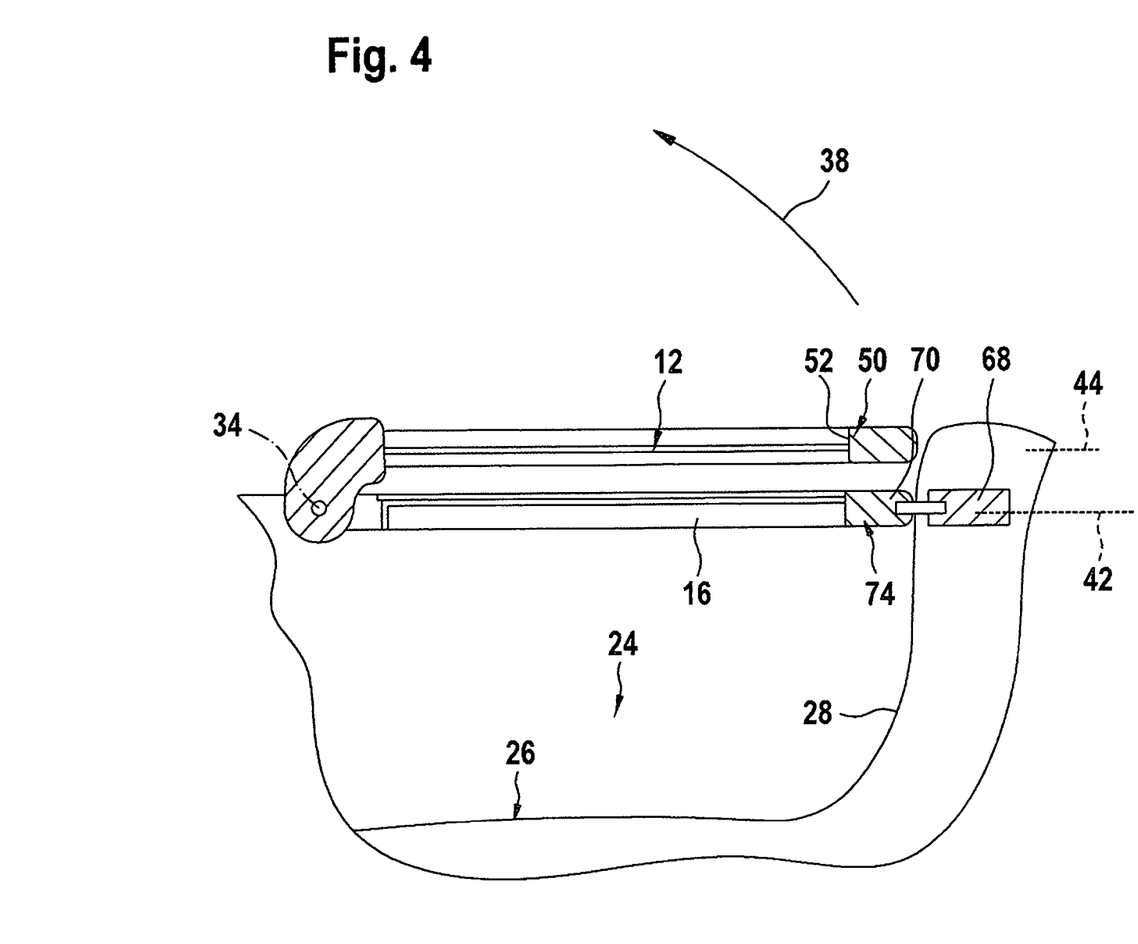
FIG. 4 shows a section along line 4-4 in FIG. 3.

The windbreak base 16 is pivotably connected to the wind deflector 12, preferably by means of pivots 32, for example pivots 32a, 32b, 32c and 32d, about a shaft 34, illustrated in FIGS. 2 and 4, so that the wind deflector 12 can be pivoted from the active position which is illustrated in FIGS. 1 and 2 by being pivoted about the shaft 34 in a pivoting direction 36 into an inactive position which is illustrated in FIGS. 3 and 4 and in which the wind deflector 12 extends substantially parallel to the windbreak base 16 and is disposed such that it lies substantially on this windbreak base.

From this inactive position, the wind deflector 12 can move relative to the windbreak base 16 back into the active position, which is illustrated in FIGS. 1 and 2 and in which the wind deflector 12 extends in a plane 40 which runs approximately transverse to a plane 42 in which the windbreak base 16 extends, by being pivoted in a pivoting direction 38 about the shaft 34.

In this case, the plane 40 preferably forms an angle of between approximately 60° and approximately 120°, even better an angle of between approximately 70° and approximately 110°, with the plane 42 in the active position of the wind deflector 12.

In contrast, the wind deflector 12 extends in a plane 44, which runs approximately parallel to the plane 42, in its inactive position illustrated in FIGS. 3 and 4.

As illustrated in FIGS. 1 and 3 in particular, the wind deflector 12 has a wind deflector frame 50 which surrounds a frame opening 52 which is closed by a wind deflector frame insert 54, the wind deflector frame insert 54 being air-permeable but wind-inhibiting, so that it prevents a rapid flow of air.

In this case, the wind deflector frame 50 can be of integral design. However, it is also feasible to form the wind deflector frame 50, as illustrated in FIGS. 1 and 3, from two frame parts 56 and 58 which can be pivoted relative to one another about a pivot axis 60 which represents, for example, the center axis of the wind deflector frame 50.

In their folded-open functional position, the two frame parts 56 and 58 extend to the maximum extent transverse to the direction of travel 18 in the plane 40 or 44, so that the two frame parts 56 and 58 also hold the wind deflector frame insert 54 spread out in the plane 40 or 44.

The frame parts 56 and 58 are preferably formed such that they are connected to one another by means of hinges 62 and 64 and in each case extend in a C-shaped manner on both sides of the pivot axis 60, so that in the functional position the whole frame opening 52 is surrounded by the C-shaped frame parts 56 and 58 and therefore, in particular in the region of the pivot axis 60, is not divided by struts.

The windbreak base 16 is likewise formed from two windbreak base parts 72 and 74 which adjoin one another in the region of a separating plane 76 in which the pivot axis 60 is also situated, but preferably can be separated from one another.

By way of example, each of the windbreak base parts 72, 74 has a frame 70 which supports a frame insert 71.

The windbreak base 16, in particular the windbreak base parts 72 and 74, is/are fixed to the vehicle body 10 by means of fixing devices 66a and 66b and 68 which are schematically illustrated in FIGS. 1 to 4.

These fixing devices 66a, 66b, and 68 are preferably provided with extendable fixing pins. In the case of fixing devices 66a and 66b, the extendable fixing pins which engage in corresponding receptacles in the vehicle body side walls 30.

In the case of the fixing device 68 the extendable fixing pin engages in a corresponding receptacle in the respective windbreak base parts 72 and 74.

The two windbreak base parts 72 and 74 are each connected to the corresponding frame parts 56 and, respectively, 58 of the wind deflector frame 50 by means of pivots 32a and 32c and, respectively, 32b and 32d.

Figure 5:
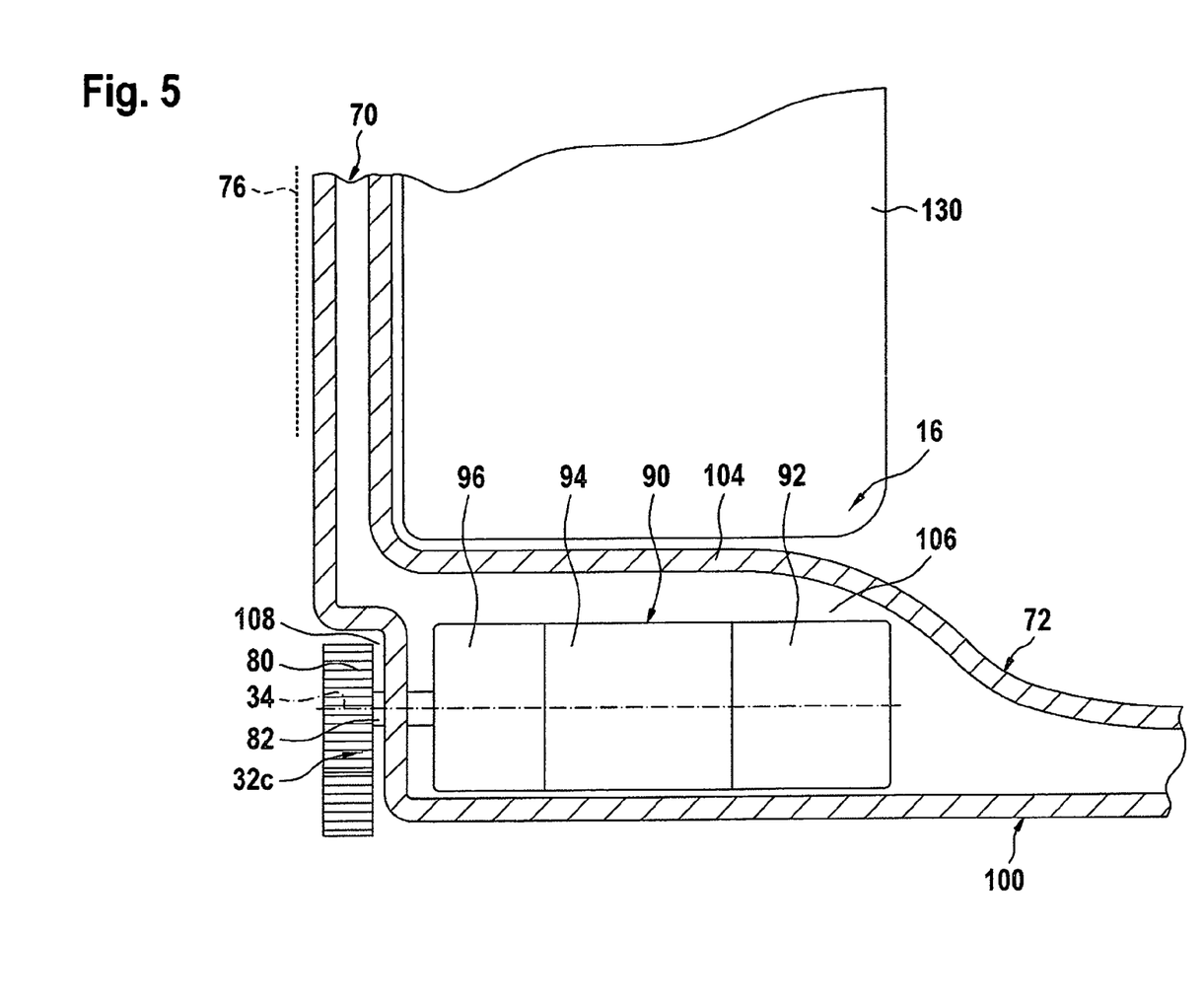
FIG. 5 shows a section along line 5-5 in FIG. 1 through a region of a front crossmember of the windbreak base, which region adjoins a separating plane.

As illustrated by way of example in FIG. 5, using the example of the pivot 32c, each of the pivots comprises a bearing flange 80 which, starting from the respective frame parts 56 or 58, extends relative to the windbreak base 16 such that the shaft 34 passes through the bearing flange 80 and the said bearing flange is mounted on the respective windbreak base part 72 or 74 such that it can rotate.

If, as illustrated in FIG. 5, the bearing flange 80 is to be driven in the sense of a pivoting movement about the shaft 34, the bearing flange 80 of the pivot 32c is seated in a rotationally fixed manner on a shaft 82 which can be driven by a drive unit which is denoted 90 in its entirety.

In this case, the drive unit 90 preferably comprises an electric drive motor 92 with a gear mechanism 94 and optionally a rotation-angle sensor 96, the shaft 82 protruding from the drive unit 90, on which shaft the bearing flange 80 is seated in a rotationally fixed manner, at the output end of the rotation-angle sensor 96.

As illustrated in FIG. 5, the drive unit 90 is integrated into a front crossmember 100, for example of the frame 70 of the windbreak base part 72, which has, for this purpose, a widened cross-sectional region 104 which forms an interior space 106 which accommodates the drive unit 90. In the illustrated exemplary embodiment, the widened cross-sectional region 104 of the front crossmember 100 is in directly connection with the separating plane 76, so that the bearing flange 80 can be disposed close to the separating plane 76 and engages in a recess 108 in the windbreak base part 72.

Figure 6:
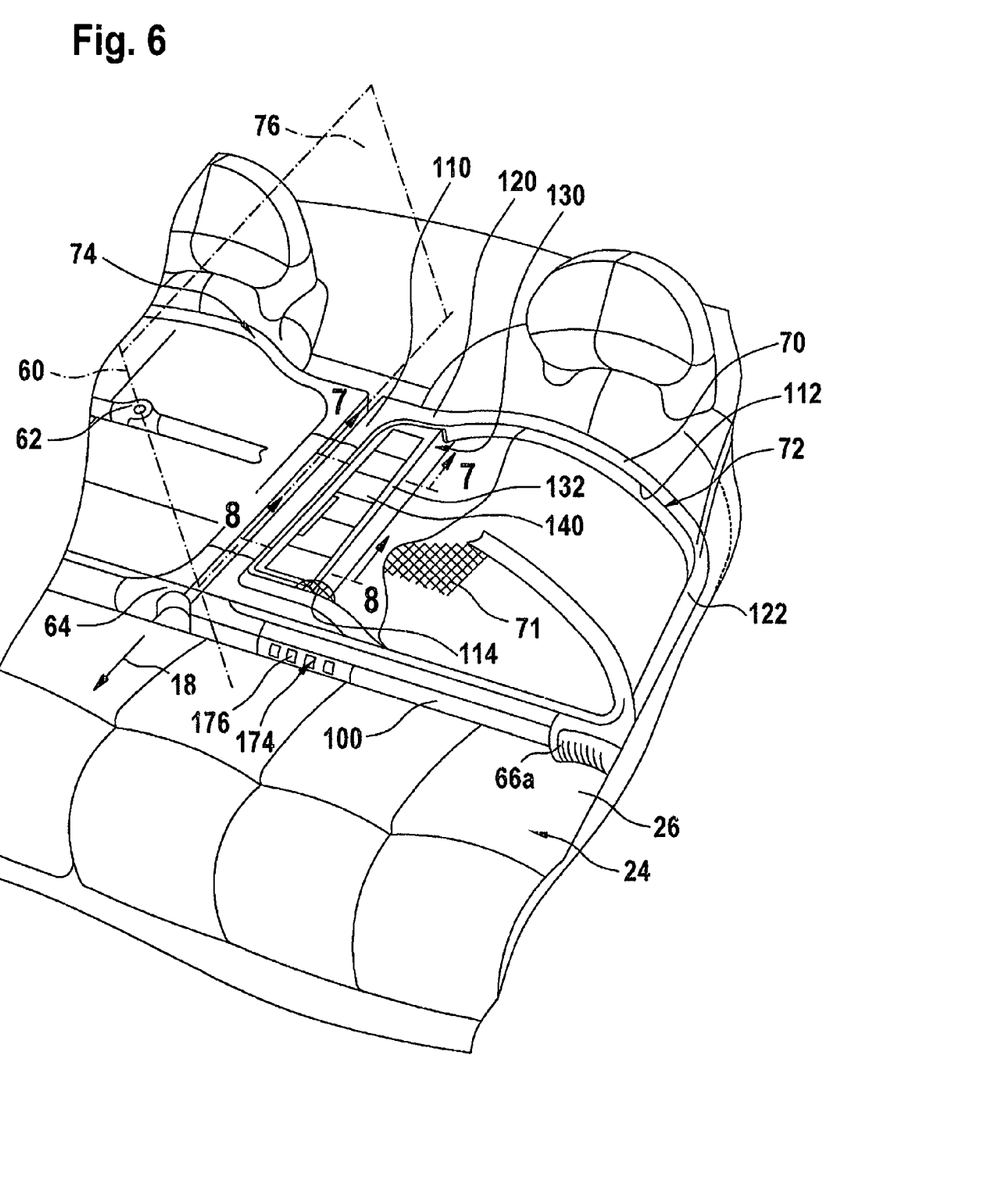
FIG. 6 shows a perspective illustration similar to FIG. 1 with the flat material of the windbreak base partially broken away in order to show a support housing for solar cells.

As illustrated in FIGS. 5 and 6, a support housing 130 is provided on the windbreak base part 72, to be precise between the front crossmember 100, a longitudinal member 110 which extends in conjunction with the separating plane 76, and a rear crossmember 120, the said support housing extending in a frame opening 112 in the frame 70 of the windbreak base part 72, preferably running along the longitudinal member 110 from the front crossmember 100 to the rear crossmember 120, and in the process being fixed to the windbreak base part 72 such that the support housing 130, as seen from above, is situated beneath a flat material 114 which forms the frame insert 71 which closes the frame opening 112, the flat material 114 being fixed on the front crossmember 100, the longitudinal member 110, the rear crossmember 120 and an outer longitudinal member 122, which together form the frame 70 of the windbreak base part 72, and being held in a tensioned manner by these.

In this case, the flat material 114 is preferably likewise air-permeable but wind-inhibiting, so that it likewise prevents a rapid flow of air in the same way as the wind deflector frame insert 54.

In this case, the flat material 114 can be an inherently stiff structure, but provision is preferably also made for the flat material 114 to be a flat textile material which is air-permeable and at least partially transparent on account of its structure.

The support housing 130 has, on its upper face 132 which faces the flat material 114, solar cells 140, the solar cells 140 largely covering the upper face 132 of the support housing 130.

Figure 7:
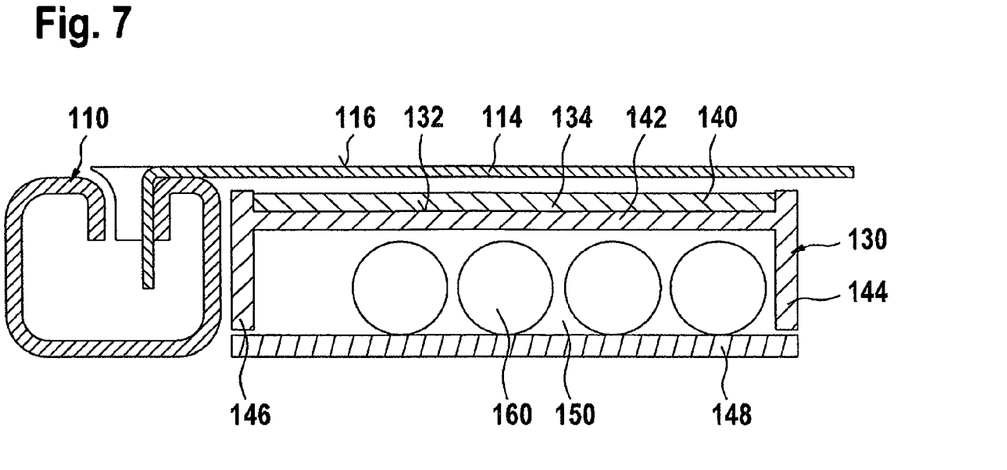
FIG. 7 shows a section along line 7-7 in FIG. 6.
Figure 8:
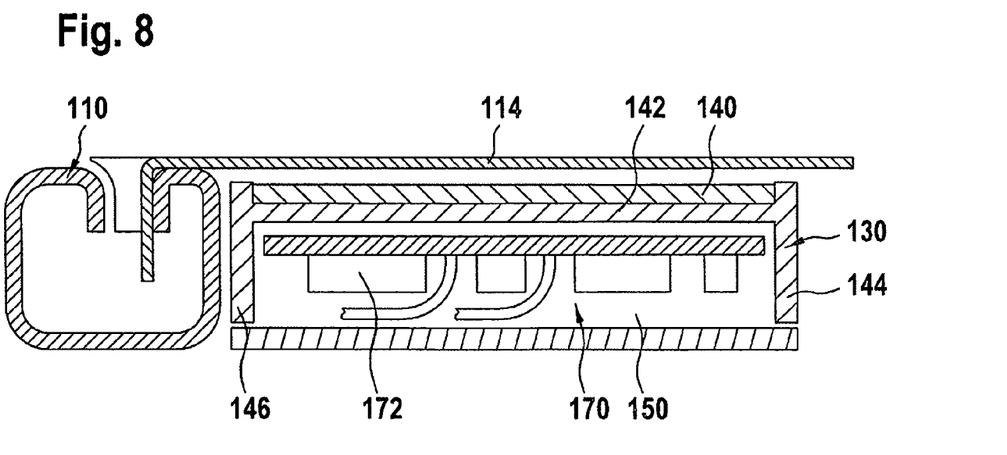
FIG. 8 shows a section along line 8-8 in FIG. 6.

As is schematically illustrated in FIG. 7, the upper face 132 of the support housing 130 is preferably provided with a recess 134 in which the solar cells 140 are disposed and thus integrated into the upper face 132 such that they are protected.

The solar cells 140 are therefore fixed relative to the windbreak base part 72 by the support housing 130.

The solar cells 140 are also mounted on a side of the flat material 114 which faces the vehicle body 10 by the support housing 130 and therefore cannot be directly seen when looking at the flat material 114 from above in the direction of the vehicle body 10, since the visual impression of a surface of the flat material 114 is of primary importance to an observer.

However, since the flat material 114 is at least partially transparent, in particular in a region 116 which extends over the solar cells 140, the solar cells 140 receive enough light in order to be able to generate current without the surface of the solar cells significantly catching the eye of an observer looking at the windbreak base 16 from above.

The upper face 132 of the support housing 130 is preferably formed by an upper housing wall 142 starting from which side walls 144 and 146 of the support housing extend, the said side walls having a housing cover 148 which runs at a distance from the upper housing wall 142, the upper housing wall 142, the side walls 144 and 146 and the housing cover 148 enclosing an interior space 150 in the support housing 130.

In the interior space 150 in the support housing 130, there is firstly disposed electrical energy storage means 160, for example rechargeable batteries, and secondly a control unit 170 which controls at least the charging of the electrical energy storage means 160 by the solar cells 140, so that the solar cells 140 always recharge the electrical energy storage means 160 when there is enough incident light.

The electrical energy storage means 160 therefore always provide enough electrical power to be able to operate the drive motor 92 to pivot the wind deflector 12 between the active and the inactive position.

The control unit 170 is preferably also provided with a function control means 172 which controls a movement of the wind deflector 12 between the active and inactive position, to be precise in dependence on, for example, a manual operator control unit 174 which is disposed on the front crossmember 100 of the windbreak base 16, for example the front crossmember 100 of the windbreak base part 72, and also has individual keys 176 with which individual functions of the wind deflector 12, in particular its movement from the active position to the inactive position and vice versa, can be controlled.

Figure 9:
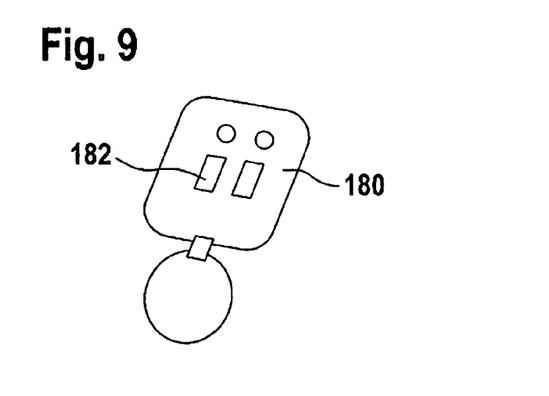
FIG. 9 shows a perspective illustration of a manual operator control means.

In addition or as an alternative to the manual operator control unit 174, a manual operator control means 180 is provided, as illustrated in FIG. 9, the said manual operator control means preferably communicating with the function control means 172 in a wire-free fashion and for its part having keys 182 with which the functions of the wind deflector, in particular its movement between the active and the inactive position and vice versa, can likewise be controlled.

The manual operator control means 180 preferably has a form which corresponds to a key fob, so that the driver can take care of this manual operator control means like a vehicle key and therefore at any time, even during driving, can pivot the wind deflector 12 from the inactive position to the active position and from the active position to the inactive position without turning around.

In the first exemplary embodiment of the windbreak device according to the invention, the support housing 130 can preferably be mounted on the windbreak base 16, in particular the windbreak base part 72, in an exchangeable manner, so that, depending on whether the windbreak device is to be operated autonomously, that is to say independently of an on-board vehicle electrical system, the support housing 130 can be fitted with the solar cells 140, the energy storage means 160 and the control unit 170 or not.

However, it is also possible to establish a wire-free connection between the function control means 172 and a vehicle function control means 184.

By virtue of the connection of the function control means 172 to the vehicle function control means 184 of the cabriolet vehicle, it is now possible to control the movement of the wind deflector 12 between the inactive position and the active position in accordance with different functional states of the cabriolet vehicle.

For example, it is possible to provide control keys on a dashboard of the cabriolet vehicle, it being possible for the operation of these control keys to be identified by the vehicle function control means 184 and for this operation to be transmitted to the function control means 172 in the form of a control signal.

It is also possible to detect a driving speed of the cabriolet vehicle using the vehicle function control means 184, and to transmit the signal that the wind deflector 12 is to be moved from the inactive position to the active position to the function control means 172 using the vehicle function control means 184 when a specific predefined speed is exceeded.

It is also possible to detect a position of a gear selector lever, and to move the wind deflector 12 from the active position to the inactive position when a reverse gear is engaged, for example, by means of the gear selector lever, in order to ensure a driver has an optimum view when driving backward, without being impeded by the wind deflector 12.

It is also possible to detect a position of a top of the cabriolet vehicle and to control the wind deflector 12 in accordance with the position of the top, for example to move the wind deflector 12 from the active to the inactive position when the top is closed or to move the wind deflector 12 from the inactive position to the active position when the top is open, that is to say when the top is in the fully opened state, for example.

It is additionally possible to check control keys of a window control means and, when a signal is given to raise all the windows of the cabriolet vehicle for example, to transmit from the vehicle function control means 184 to the function control means 172 the instruction that the wind deflector 12 is to be moved from its inactive position to its active position in this case too, the windows then always being raised when traveling at relatively high speeds in order to suppress the occurrence of drafts in the region of the front row of seats, so that it is also expedient to move the wind deflector 12 from the inactive position to the active position in this driving state too, since this prevents the occurrence of drafts from air turbulence which forms in the region of the rear, during driving.

Figure 10:
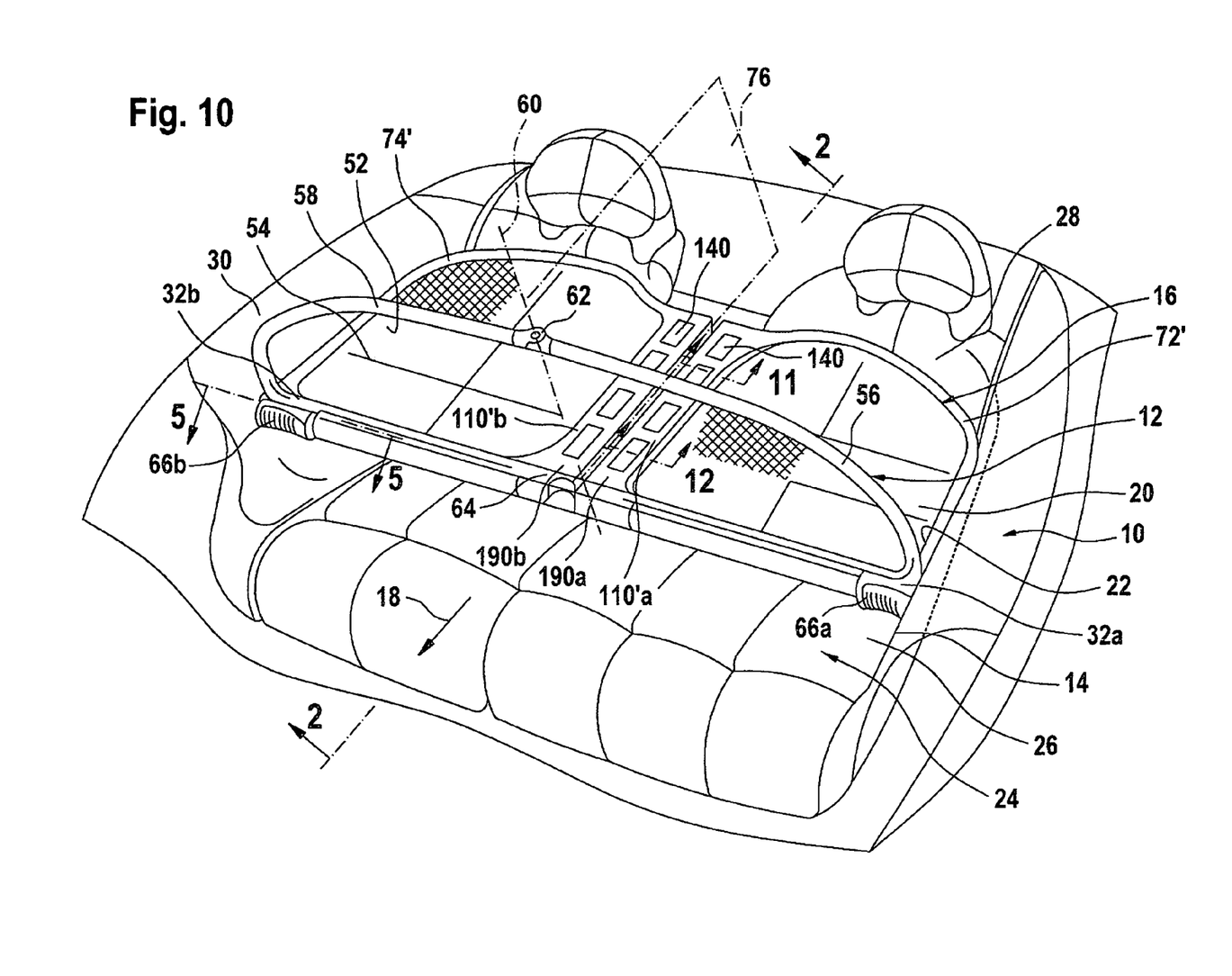
FIG. 10 shows a perspective illustration similar to FIG. 1 of a second exemplary embodiment of a windbreak device according to the invention.

In a second exemplary embodiment of a windbreak device according to the invention, illustrated in FIG. 10, the longitudinal members 110'*a* and 110'*b* of the windbreak base parts 72' and 74' form the support housing for the solar cells 140. To this end, the longitudinal members 110'*a* and 110'*b* are formed such that they widen transverse to the direction of travel 18, so that their upper faces 190*a* and 190*b* can be provided with the solar cells 140. In this case, the solar cells 140 are preferably likewise integrated into the upper faces 190*a* and 190*b* of the longitudinal members 110'*a* and 110'*b* and therefore preferably provide an advantageous overall impression.

Figure 11:
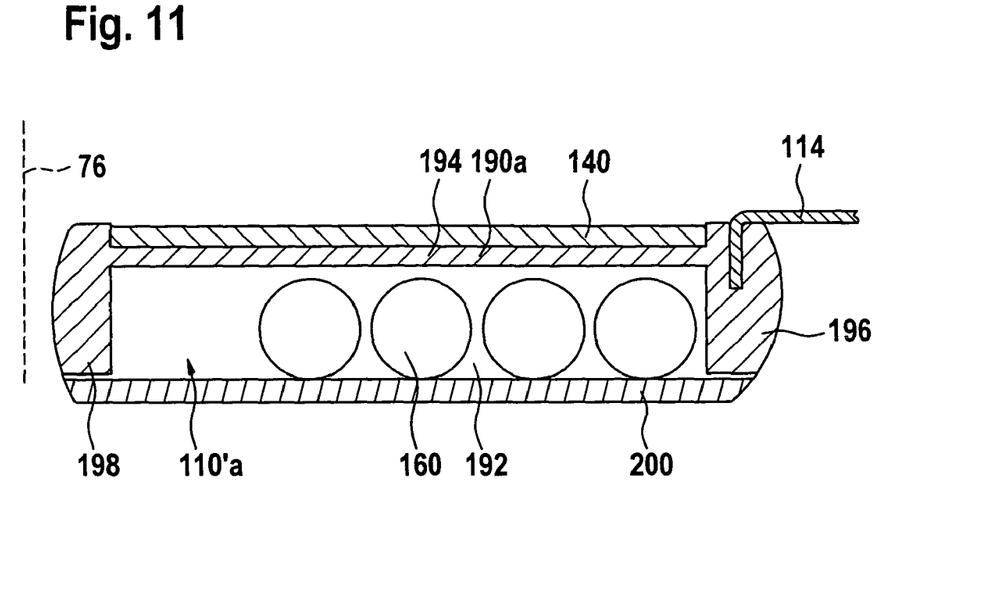
FIG. 11 shows a section along line 11-11 in FIG. 10.
Figure 12:
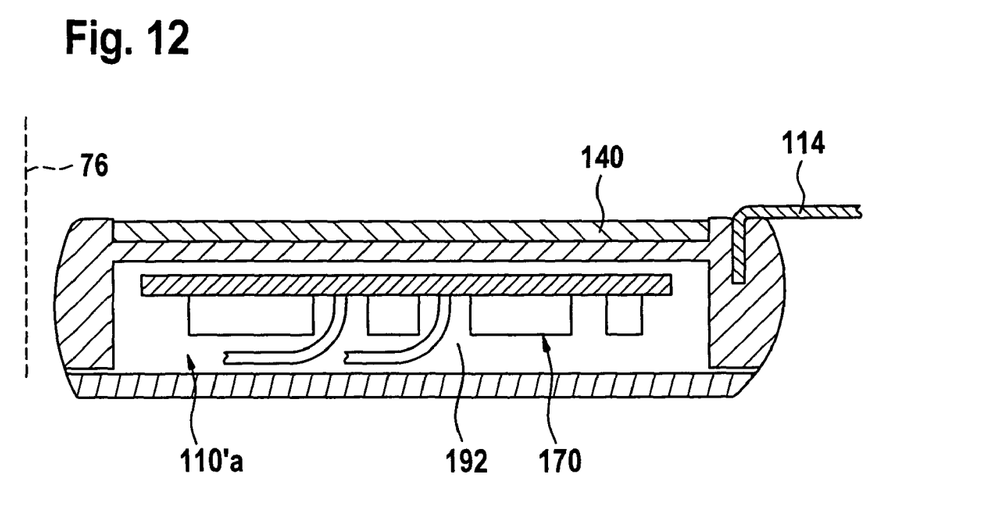
FIG. 12 shows a section along line 12-12 in FIG. 10.

On account of the fact that the longitudinal members 110'*a* and 110'*b* are of widened form, it is possible, as illustrated in conjunction with the longitudinal member 110'*a* in FIGS. 11 and 12, to use the longitudinal member 110'*a* (and likewise longitudinal member 110'*b*) itself directly as a support housing and to provide firstly the electrical energy storage means 160 and secondly the control unit 170, which have the same function as has been described in conjunction with the first exemplary embodiment, in an interior space 192 in the support housing.

To this end, the longitudinal members 110'*a* and 110'*b* are preferably in the form of widened profiled tubes with an upper wall 194, side walls 196 and 198 and also a lower removable cover 200, it being possible to gain access to the interior space 192 via the removable cover 200.

Figure 13:
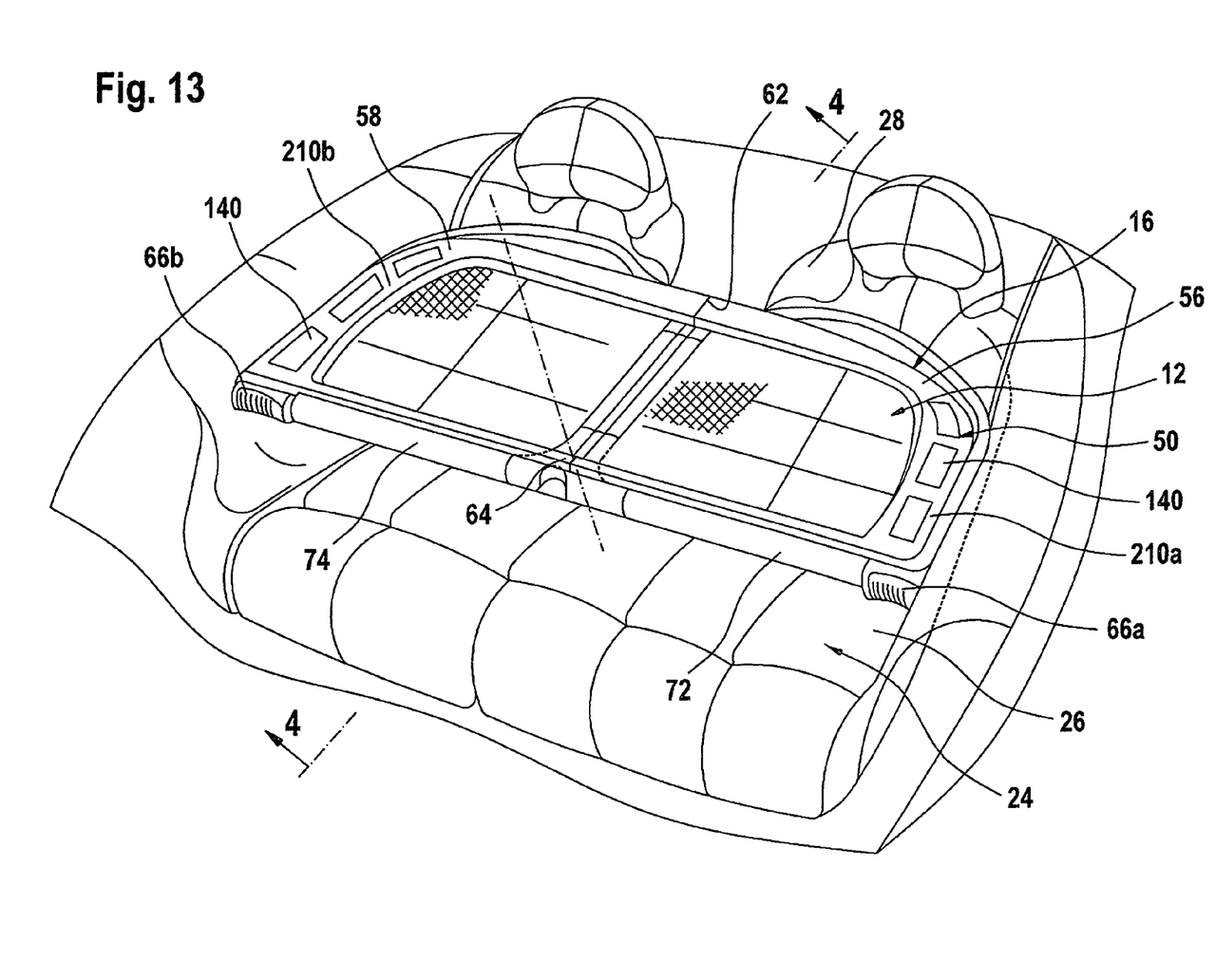
FIG. 13 shows a perspective illustration similar to FIG. 3 of a third exemplary embodiment of a windbreak device according to the invention.

In contrast to the second exemplary embodiment, in a third exemplary embodiment which is illustrated in FIG. 13, it is not elements of the windbreak base 16 which are widened, but outer regions 210*a* and 210*b* frame parts 56 and 58 of the wind deflector frame 50, which parts form a C-shape, and these outer regions 210*a* and 210*b* support the solar cells 140.

Furthermore, corresponding to the longitudinal members 110'*a* and 110'*b* of the second exemplary embodiment, the regions 210*a* and 210*b* of the frame parts 56 and 58 are also provided with an interior space in which the electrical energy storage means 160 and the control unit 170 are disposed, reference being made in full to the statements made about the first and second exemplary embodiments with regard to the functions of the said electrical energy storage means and control unit.

In contrast to the first and second exemplary embodiments, the solar cells 140 are therefore not disposed on the windbreak base 16 but on the movable wind deflector 12. This solution has the advantage that the solar cells 140 receive light in an optimal manner both in the active position and in the inactive position, since the said solar cells are not covered by the wind deflector 12 in the inactive position, as is the case in the first and second exemplary embodiments.

Furthermore, in the third exemplary embodiment, the electrical energy storage means 160 can also, as before, be disposed in the windbreak base 16, for example in the windbreak base parts 72 and 74, for example in the front crossmembers 100*a*, 100*b*, so that the weight of the electrical energy storage means 160 does not require a higher power from the drive motor 92 when the wind deflector 12 moves from the inactive to the active position.

Since the weight of the solar cells 140 is not important, in contrast to the weight of the electrical energy storage means 160, the increase in weight in the region of the frame 50 of the wind deflector 12 by the arrangement of the solar cells 140 is of no or only little relevance.

Otherwise, those elements of the third exemplary embodiment which are identical to those of the first or second exemplary embodiment are provided with the same reference symbols, so that reference can be made in full to the statements made about the above exemplary embodiments for an explanation of the said third exemplary embodiment.

The invention claimed is:

1. Windbreak device for cabriolet motor vehicles having on-board electrical systems, comprising:
   a windbreak base which is disposed level with a beltline of a vehicle body,
   a wind deflector which is connected to the windbreak base in an articulated manner and can be pivoted from an inactive position, which extends approximately level with the beltline of the vehicle body, into an active position which rises above the beltline and runs approximately transverse with respect to said beltline,
   an electric drive unit by which the wind deflector can be moved between the inactive and the active position relative to the windbreak base,
   an electrical energy storage means which is separate from the on-board electrical system of the vehicle and provides electrical energy for operating the electric drive unit, and
   solar cells by which the electrical energy storage means can be charged, said solar cells being disposed in a support housing fixed to a frame of the windbreak base.

2. Windbreak device according to claim 1, wherein the support housing is detachably fixed to the frame.

3. Windbreak device for cabriolet motor vehicles having on-board electrical systems, comprising:
   a windbreak base which is disposed level with a beltline of a vehicle body,
   a wind deflector which is connected to the windbreak base in an articulated manner and can be pivoted from an inactive position, which extends approximately level with the beltline of the vehicle body, into an active position which rises above the beltline and runs approximately transverse with respect to said beltline,
   an electric drive unit by which the wind deflector can be moved between the inactive and the active position relative to the windbreak base,
   an electrical energy storage means which is separate from the on-board electrical system of the vehicle and provides electrical energy for operating the electric drive unit,
   a frame for the wind deflector, said frame having frame openings and a flat material extending in said openings, and
   solar cells by which the electrical energy storage means can be charged, said solar cells being mounted on the frame of the wind deflector.

4. Windbreak device according to claim 3, wherein the solar cells are disposed on the frame.

5. Windbreak device according to claim 4, wherein the solar cells are disposed in a frame region.

6. Windbreak device for cabriolet motor vehicles having on-board electrical systems, comprising:
   a windbreak base which is disposed level with a beltline of a vehicle body,
   a wind deflector which is connected to the windbreak base in an articulated manner and can be pivoted from an inactive position, which extends approximately level with the beltline of the vehicle body, into an active position which rises above the beltline and runs approximately transverse with respect to said beltline,
   an electric drive unit by which the wind deflector can be moved between the inactive and the active position relative to the windbreak base,
   an electrical energy storage means which is separate from the on-board electrical system of the vehicle and provides electrical energy for operating the electric drive unit, and
   a control unit which monitors at least a charge state of the energy storage means.

7. Windbreak device according to claim 6, wherein the control unit is disposed in a support housing.

8. Windbreak device according to claim 6, wherein the control unit is disposed in a frame of the windbreak device.

9. Windbreak device according to claim 6, wherein the control unit comprises a function control means for the wind deflector.

10. Windbreak device according to claim 9, wherein the function control means communicates with a manual operator control unit.

11. Windbreak device according to claim 10, wherein the manual operator control unit is fixedly disposed on the windbreak device.

12. Windbreak device according to claim 10, wherein the manual operator control unit is disposed on the windbreak base.

13. Windbreak device according to claim 10, wherein the manual operator control unit is disposed in a support housing.

14. Windbreak device according to claim 10, wherein the manual operator control unit is disposed on a frame of the windbreak device.

15. Windbreak device according to claim 10, wherein the function control means communicates with a manual operator control means in a wire-free fashion.

16. Windbreak device for cabriolet motor vehicles having on-board electrical systems, comprising:
   a windbreak base which is disposed level with a beltline of a vehicle body,
   a wind deflector which is connected to the windbreak base in an articulated manner and can be pivoted from an inactive position, which extends approximately level with the beltline of the vehicle body, into an active position which rises above the beltline and runs approximately transverse with respect to said beltline,
   an electric drive unit by which the wind deflector can be moved between the inactive and the active position relative to the windbreak base,
   an electrical energy storage means which is separate from the on-board electrical system of the vehicle and provides electrical energy for operating the electric drive unit, and
   solar cells by which the electrical energy storage means can be charged, said solar cells being disposed on a side of the windbreak base which faces away from the vehicle body.

17. Windbreak device according to claim 16, wherein a frame of the windbreak base forms a support region for the solar cells.

18. Windbreak device according to claim 16, wherein the electric drive unit is disposed on the windbreak base.

19. Windbreak device according to claim 18, wherein the windbreak base has two windbreak base parts, and the electric drive unit is integrated into one of the windbreak base parts.

20. Windbreak device according to claim 18, wherein the electric drive unit is integrated into the windbreak base.

21. Windbreak device according to claim 20, wherein the windbreak base has a support member, and the electric drive unit is integrated into a region of the support member of the windbreak base.

22. Windbreak device according to claim 16, wherein the solar cells are disposed in a support housing.

23. Windbreak device according to claim 22, wherein the solar cells are integrated into an upper face of the support housing.

24. Windbreak device according to claim 22, wherein the electrical energy storage means is disposed in the support housing.

25. Windbreak device according to claim 22, wherein the windbreak base has two windbreak base parts, and the support housing for the solar cells is mounted at least on one of the windbreak base parts.

26. Windbreak device according to claim 16, wherein the windbreak base has a frame, and the solar cells are mounted on the frame.

27. Windbreak device according to claim 26, wherein the frame forms a housing for the electrical energy storage means.

28. Windbreak device according to claim 26, wherein the solar cells are disposed on the frame.

29. Windbreak device according to claim 28, wherein the solar cells are disposed on a frame support member.

30. Windbreak device according to claim 26, wherein the frame has frame openings, and the solar cells are disposed in a region of the frame openings.

31. Windbreak device according to claim 30, wherein the solar cells are covered by a flat material which covers over the frame openings.

32. Windbreak device according to claim 30, wherein the flat material is a flat textile material.

33. Windbreak device according to claim 30, wherein the flat material is at least partially transparent.

34. Windbreak device according to claim 33, wherein the flat material is more transparent in a region which covers over the solar cells.

35. Windbreak device according to claim 34, wherein the flat material has a lower thread density in the region which covers over the solar cells than in other regions.

* * * * *